United States Patent [19]

Ogura

[11] Patent Number: 4,908,664

[45] Date of Patent: Mar. 13, 1990

[54] IMAGE FORMING APPARATUS

[75] Inventor: Masahiko Ogura, Yokohama, Japan

[73] Assignee: Kabushiki Kaisha Toshiba, Kawasaki, Japan

[21] Appl. No.: 344,484

[22] Filed: Apr. 27, 1989

Related U.S. Application Data

[63] Continuation of Ser. No. 168,571, Mar. 7, 1988, abandoned, which is a continuation of Ser. No. 879,192, Jun. 26, 1986, abandoned.

[30] Foreign Application Priority Data

Jun. 28, 1985 [JP] Japan .............................. 60-142160

[51] Int. Cl.[4] .............................................. G03B 27/32

[52] U.S. Cl. ...................................... 355/235; 355/200

[58] Field of Search ..................... 355/23, 26, 200, 235

[56] References Cited

U.S. PATENT DOCUMENTS

| | | | |
|---|---|---|---|
| 3,675,999 | 7/1972 | Komori et al. | 355/23 X |
| 3,869,202 | 3/1975 | Tabata et al. | 355/23 X |
| 4,098,551 | 7/1978 | Komori et al. | 355/3 R |
| 4,256,400 | 3/1981 | Komori et al. | 355/7 X |
| 4,441,805 | 4/1984 | Smith | 355/55 X |
| 4,540,927 | 9/1985 | Tanimoto | 355/235 X |
| 4,561,764 | 12/1985 | Sugiura | 355/235 |
| 4,561,771 | 12/1985 | Sugiura | 355/235 |
| 4,595,273 | 6/1986 | Watanabe et al. | 355/3 R |
| 4,618,244 | 10/1986 | Watanabe | 355/235 |
| 4,739,372 | 4/1988 | Watanabe | 355/25 |

*Primary Examiner*—Fred L. Braun

*Attorney, Agent, or Firm*—Cushman, Darby & Cushman

[57] ABSTRACT

An apparatus for obtaining two copies from first and second original documents respectively. An original document table is provided having two original document holding areas capable of holding the first and second original documents. Under the original table, an optical scanning unit which moves relative to the original table is provided for scanning the first and second original documents placed on the table on the surface of the optical scanning unit, a boundary line is provided with is visible through the table. When waiting for image forming operation to begin (during standby), the optical scanning unit is positioned at a boudnary between the first and second original documents. Therefore, the operator may use the boundary line as an indicator for setting the original documents in place.

5 Claims, 10 Drawing Sheets

IMAGE FORMING APPARATUS

This is a continuation of application Ser. No. 07/168,571, filed Mar. 7, 1988, which was abandoned upon the filing hereof which, in turn, is a continuation of application Ser. No. 06/879,192, filed June 26, 1986, now abandoned.

BACKGROUND OF THE INVENTION

1. Field of the Invention

The present invention relates to an image forming apparatus. More specifically, the invention relates to a copying machine which can set two original documents in juxtaposition so that each can be copied.

2. Description of the Prior Art

Recently, there has been developed a practical application of copying machines in which, for example, two original documents are set beside one another so that reproduced images of each document are formed respectively on the top surfaces of two sheets of copy paper or on the front and rear surface of a single sheet of copy paper. A problem in such copying machines in the past has been that the location of the boundary between the two original documents is not clearly known. There are machines in which the location of a boundary is marked on the original document support, but this involves the problem that the copy size is fixed.

SUMMARY OF THE INVENTION

It is an object of the present invention to provide an improved image forming apparatus in which the location of the boundary between original documents is clearly known and in which two original documents may be properly set in place.

According to one aspect of the present invention, there is provided an image forming apparatus comprising:

an original document table having two original document holding areas capable of holding first and second original documents placed on the holding areas;

optical scanning means, relatively movable along the original document table, for optically scanning the first and second original documents placed on the original document table and for forming reflected light images thereof;

image forming means for producing visible images on an image forming medium corresponding to the light images; and controlling means for controlling the optical scanning means: (1) to be normally positioned at the boundary portion between the first original document and the second original document, (2) to optically scan the first original document, (3) to optically scan the second original document, and (4) to return to the boundary portion between the first original document and the second original document after the optical scanning of the first and second original documents.

BRIEF DESCRIPTION OF THE DRAWINGS

FIGS. 1 through 15 show an embodiment of an image forming apparatus according to the present invention, in which:

FIG. 1 is a plan view showing an original document table;

FIGS. 2 and 3 are plan views for explaining setting of original documents on the original document table;

FIG. 4 is a diagram showing a operation of the first optical unit;

FIG. 5 is a timechart showing a relation between time and step number of a stepping motor;

FIG. 6 is a block diagram showing a control circuit;

FIG. 7 is an external perspective view of a copying machine in accordance with the present invention;

FIG. 8 is a schematic front view, in longitudinal section, of the copying machine of FIG. 7;

FIG. 9 is a schematic front view, in longitudinal section, of the FIG. 7 copying machine main body;

FIG. 10 is a plan view of a control panel;

FIG. 11 is an operational schematic elevation of the structure of an optical exposure apparatus;

FIG. 12 is an operational schematic elevation showing a cooling air guideway;

FIG. 13 is a perspective view of a means for operating 1st and 2nd optical units of the optical exposure apparatus;

FIG. 14 is an operational section of a main part of the means for operating the optical units of the optical exposure apparatus of FIG. 13; and FIG. 15 is a plane view showing a means for operating a lens unit and a 3rd optical unit of the optical exposure apparatus.

DETAILED DESCRIPTION OF THE PREFERRED EMBODIMENTS

An embodiment of the present invention will now be described with reference to the attached drawings.

Figure 7:
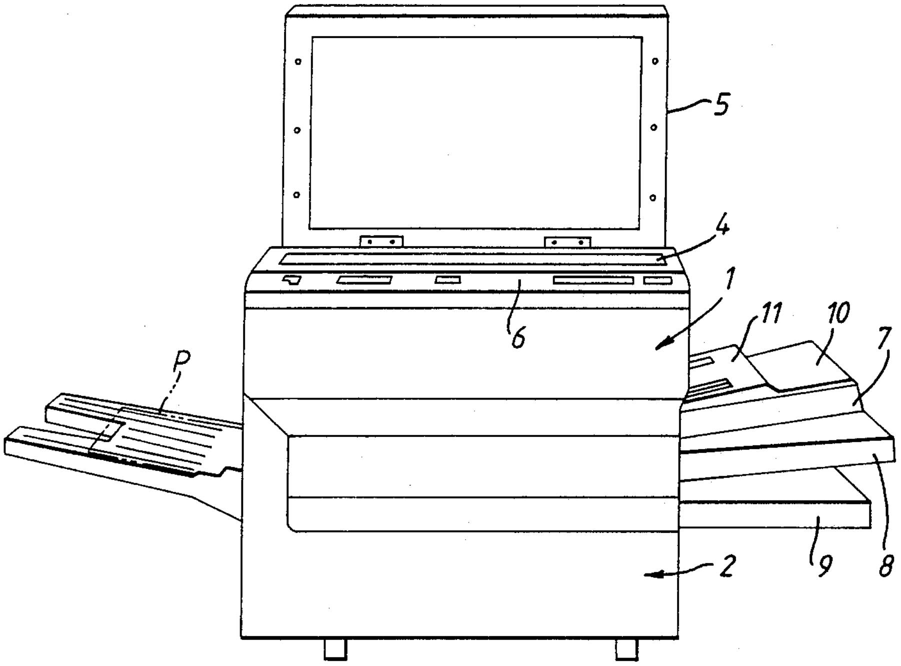
Figure 8:
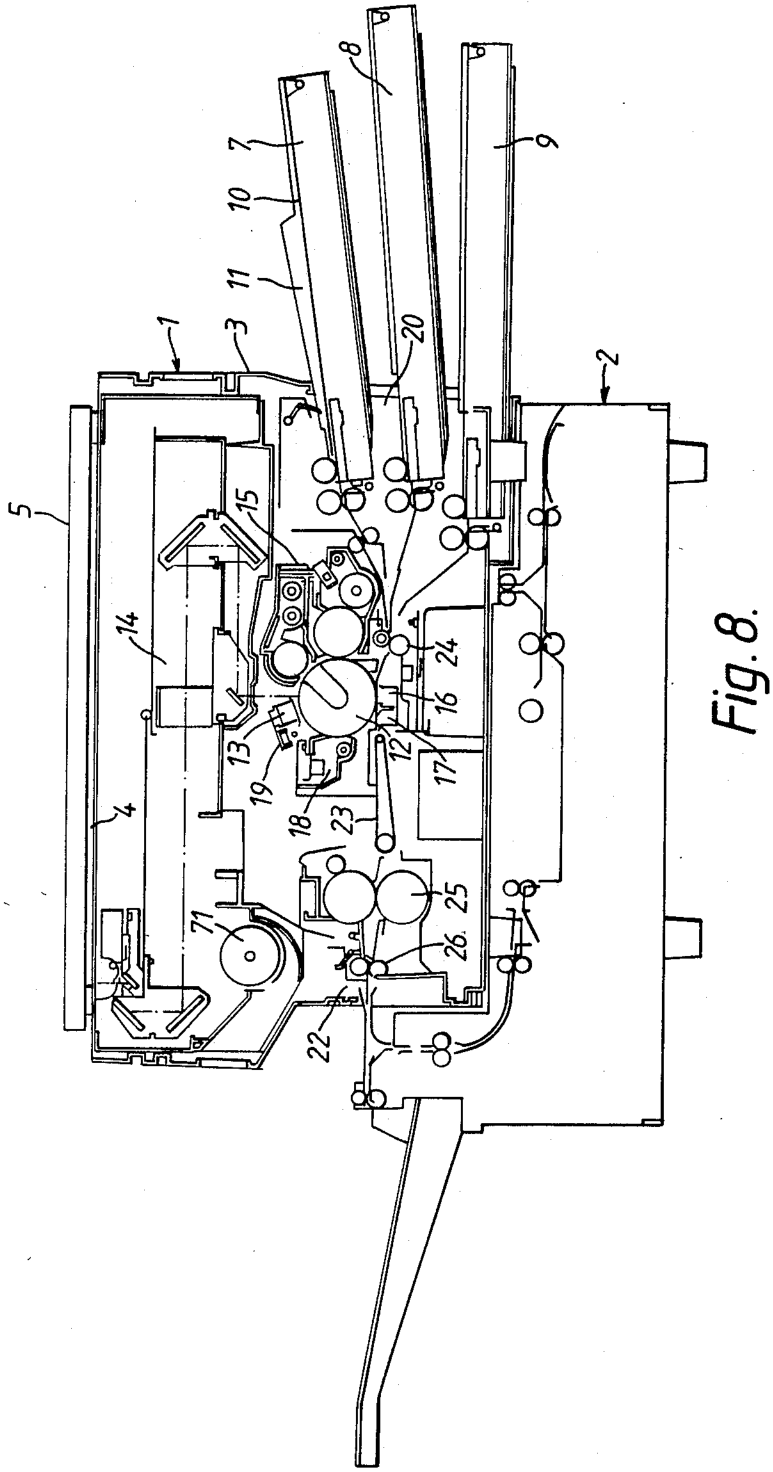

FIGS. 7 and 8 show a copying machine as an example of an image forming apparatus according to the present invention. Numeral 1 designates a copying machine main body, and numeral 2 designates a direction-change unit by which, depending on copying requirements, copy paper P fed out from a feed-out section of copying machine main body 1 can be received and can be returned again to the copying machine main body 1, either as it is or after it has been turned upside down, so as to permit multiple image formation thereon or formation of images on both sides thereof. Direction-change unit 2 also serves as a stand on which copying machine main body 1 is placed.

Figure 9:
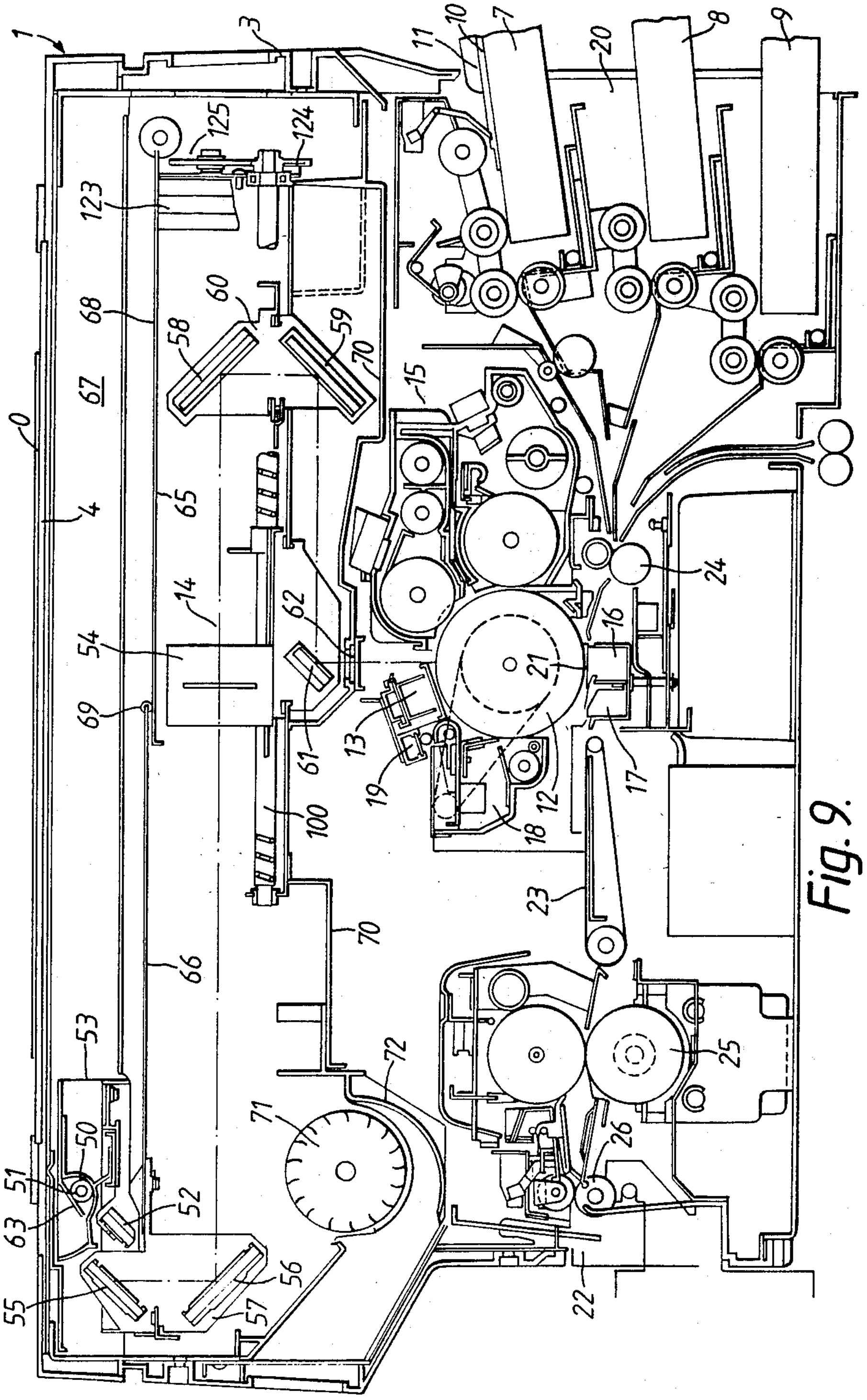

Copying machine main body 1 has a construction as shown in FIG. 9. In FIG. 9, numeral 3 designates a housing on whose upper surface there is provided an original document table (i.e., a transparent glass) 4. Original document table 4 has two document holding areas capable of holding two documents placed on the holding areas. An openable original cover 5 is arranged near table 4. At the upper-surface front edge portion of housing 3, there is also provided a control panel 6, which will be described below with reference to FIG. 10. Paper supply cassettes 7, 8 and 9 are fitted on a right-hand surface portion of housing 3. A cassette cover 10 of upper-stage paper supply cassette 7 retains a manually inserted paper supply block 11 for supply of copy paper P by appropriate manual insertion. A photosensitive drum 12 is disposed in a generally central portion of housing 3, and a charging unit 13, an optical exposure apparatus 14, a two-colour development apparatus 15 (which will be described later), a transfer unit 16, a peel-off unit 17, a cleaning unit 18 and a residual image removal unit 19 are successively disposed around the periphery of photosensitive drum 12. In a lower portion inside housing 3, there is defined a copy paper P transport path 23 through which copy paper P supplied from an automatic paper supply unit 20 in which paper supply cassettes 7, 8 and 9 are mounted is supplied. Copy paper P is supplied by manual insertion from manually inserted paper supply block 11, and copy paper P introduced from direction-change unit 2 is led between transfer unit 16 and an image transfer section 21 to a feed-out section 22 provided on a left-hand surface portion of housing 3. Registration rollers 24 are provided on the side of copy paper P path 23 that is upstream of image transfer section 21, and a fixing unit 25 and paper feed-out rollers 26 are provided on the downstream side.

Figure 10:
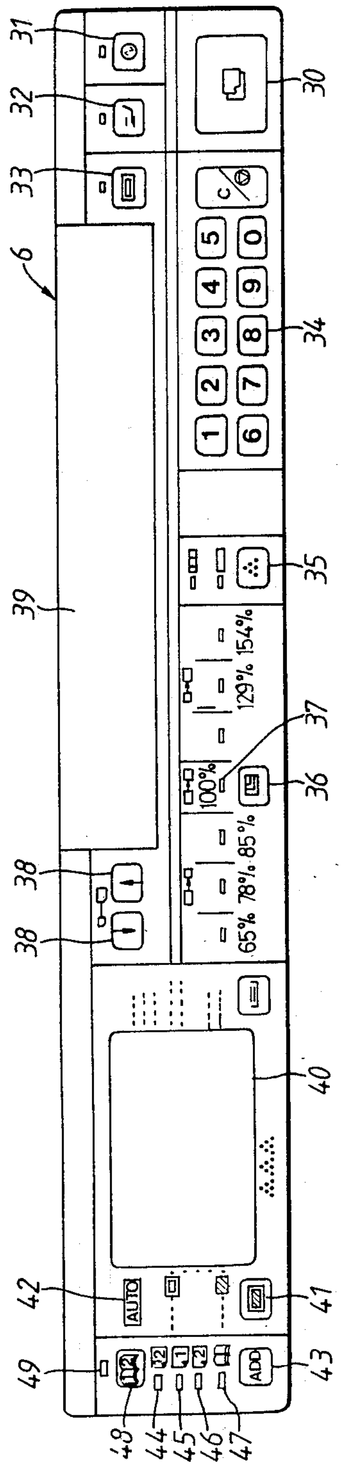

Control panel 6 has a construction as shown in FIG. 10. Numeral 30 designates a print key for causing execution of photocopying operation; numeral 31 designates an energy saver key for setting the copying machine in a preheat state; numeral 32 designates an interrupt key for setting an interrupt mode in order to effect interrupt copying; numeral 33 designates a total counter key which is depressed when it is required to check the total number of copies; numeral 34 designates number keys for setting the number of copies, etc.; numeral 35 designates color selection keys for selecting the color of copies; numeral 36 designates a magnification selection key for setting the magnification ratio of copies; numeral 37 designates indicating lamps for indicating the magnification ratio selected by magnification selection key 36; numeral 38 designates a zoom key for adjustably setting the magnification ratio; and numeral 39 designates a 1st display section which displays a message of guidance for operation or of the copying machine condition and the set number of copies and magnification. Numeral 40 designates a 2nd display section for indicating the operation condition of the individual parts. Numeral 41 designates a manual exposure key for setting the copy density manually, and numeral 42 designates an automatic exposure key for automatic setting of the copy density. Numeral 43 designates a mode setting key for setting the copying mode. Depression of mode setting key 43 causes mode display lamps 44–47 to light up in succession and changes the copying mode.

Mode display lamp 44 is a display lamp for a double copy mode in which 1st and 2nd copies are superimposed on the surface of a single sheet of copy paper. Mode display lamp 45 is a display lamp for a single original document, both-side copying mode in which a 1st copying operation is effected on the top side of a sheet of copy paper and a 2nd copying operation is effected on the rear side of the same sheet. Mode display lamp 46 is a display lamp for two original documents, both-side copying mode in which two original documents are set on original document table 4, the 1st original document being copied on the top side of a sheet of copy paper and the 2nd original document being copied on the rear side of the same sheet of copy paper. Mode display lamp 47 is a display lamp for a two-side book copying mode in which the 1st page of a book is copied on the top surface of a 1st sheet of copy paper, the 2nd page is copied on the top side of a 2nd sheet of copy paper and the 3rd page is copied on the rear side of the 2nd sheet of copy paper. There is also a book copying mode key 48 and a book copying mode display lamp 49. In this mode, the 1st page of a book is copied on the top surface of a 1st sheet of copy paper, and the 2nd page is copied on the top surface of a 2nd sheet of copy paper.

Figure 11:
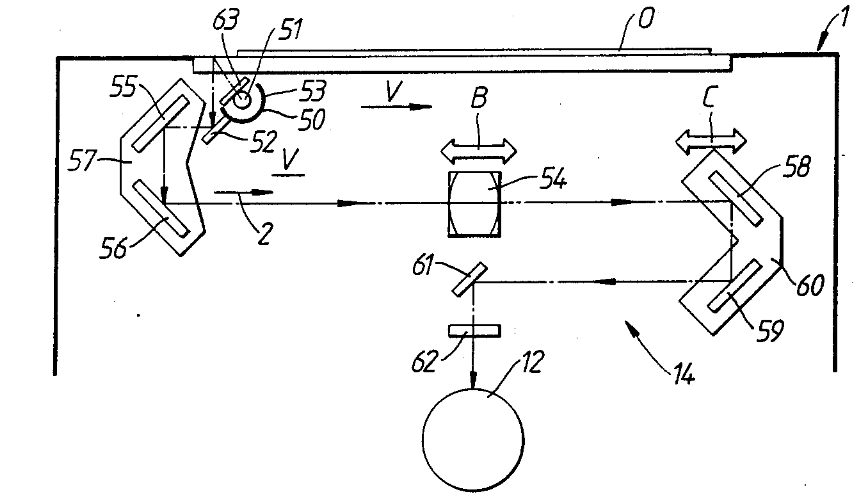
Figure 12:
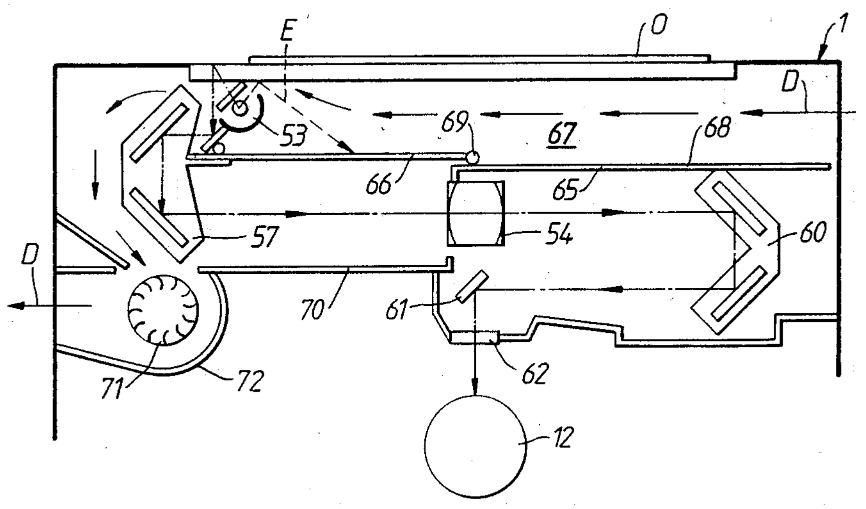

Optical exposure apparatus 14 has a construction as shown in FIGS. 11 and 12 and includes an exposure lamp 51 whose rear portion is surrounded by a reflector 50 and which radiates light onto an original document 0 on original document table 4. Optical exposure apparatus 14 also includes a 1st mirror 52 by which light reflected from original document 0 is reflected in a set direction and a 1st optical unit 53 which is movable parallel to the lower surface of original document table 4. Apparatus 14 also includes a 2nd mirror 55 which moves synchronously with 1st optical unit 53 and in the same direction as 1st optical unit 53 but at half its speed. During operation an optical image is reflected from 1st optical unit 53 and reflected towards a lens unit 54 and a 2nd optical unit 57 including a 3rd mirror 56. The structure further comprises, in the stage to the rear of lens unit 54, a 3rd optical unit 60 including a 4th mirror 58, a 5th mirror 59 and a fixed 6th mirror 61 by which an optical image reflected from 3rd optical unit 60 is reflected towards photosensitive drum 12. Numeral 62 designates anti-dust glass provided between 6th mirror 61 and photosensitive drum 12, and numeral 63 designates heat ray absorption glass provided in front of exposure lamp 51.

In FIG. 9, with exposure lamp 51 lit, 1st optical unit 53 moves at a speed V parallel to original document table 4, and 2nd optical unit 57 moves in synchronism with this movement in the same direction but at a speed that is half of speed V, whereby an original document 0 on original document table 4 is scanned, an image is focussed on photosensitive drum 12, which is already rotating, and an electrostatic latent image corresponding to original document 0 is formed on photosensitive drum 12, which has been uniformly charged by charging unit 13.

The electrostatic latent image thus formed is developed by being brought opposite development apparatus 15, after which it is brought into image transfer section 21 facing transfer unit 16. The developed image is transferred onto copy paper P that has been supplied via registration rollers 24. Next, the copy paper P onto which an image has been transferred is peeled off photosensitive drum 12 by peel-off unit 17, and then it is led along transport path 23 to fixing unit 25, where the image is fixed and then fed out via feed-out rollers 26 to feed-out section 22. Meanwhile, following transfer of the developed image onto the copy paper P, the surface of photosensitive drum 12 has residual developer (toner) cleaned off by being brought opposite cleaning unit 18, and then any residual image is removed by residual image removal unit 19, thereby allowing the next copying operation to take place.

As described later, lens unit 54 and 3rd optical unit 60 provided with 4th and 5th mirrors 58 and 59, which are disposed at an angle of 90 with respect to each other, are constructed so that they can move in the manner indicated by the arrows B and C in FIG. 11, respectively, so as to permit alteration of the object distance and the distance between the lens and the image formation plane.

As shown in FIGS. 9 and 12, there is provided a 1st shielding element 65 which is disposed so that it covers the upper surfaces of lens unit 54 and the 3rd optical unit. Shielding unit 65 also serves as a lens cover, and 2nd optical unit 57 is provided with a 2nd shielding element 66 in a disposition such that it partially overlaps 1st shielding element 65. Above 1st and 2nd shielding elements 65 and 66, there is defined a partitioning means 68 which effects partitioning such that a cooling air guideway 67 is defined along original document table 4. The unmounted end of 2nd shielding element 66 is guided on the top of 1st shielding element 65 by a support means 69 constituted by a roller or slide element, the arrangement thus being such that there is no need for a special guide means.

The plane below 2nd optical unit 57, lens unit 54 and 3rd optical unit 60 is covered by a partition board 70 which supports a portion of anti-dust glass 62 and has one end connected to the fan casing 72 of a ventilation fan 71, whereby housing 3 is thus divided into generally upper and lower portions.

As indicated by arrows D in FIG. 12, the action of ventilation fan 71 results in cooling air that has been directed into cooling air guideway 67 from the right-hand side surface of housing 3 and guided steadily by 1st shielding element 65 and 2nd shielding element 66 along the lower side of original document table 4 to a left-hand surface portion, after which it is evacuated to the exterior. This permits satisfactory cooling of exposure lamp 51 and extends the life of exposure lamp 51 by preventing it from overheating and at the same time keeps adverse effects of heat on other parts to a minimum. Also, the whole area of original document table 4 is cooled so that the operator is not caused to feel uneasy. Further, image faults caused by stray light entering lens unit 54 are effectively prevented, since stray light is shut out by 2nd shielding element 66, as indicated by arrow E.

Figure 13:
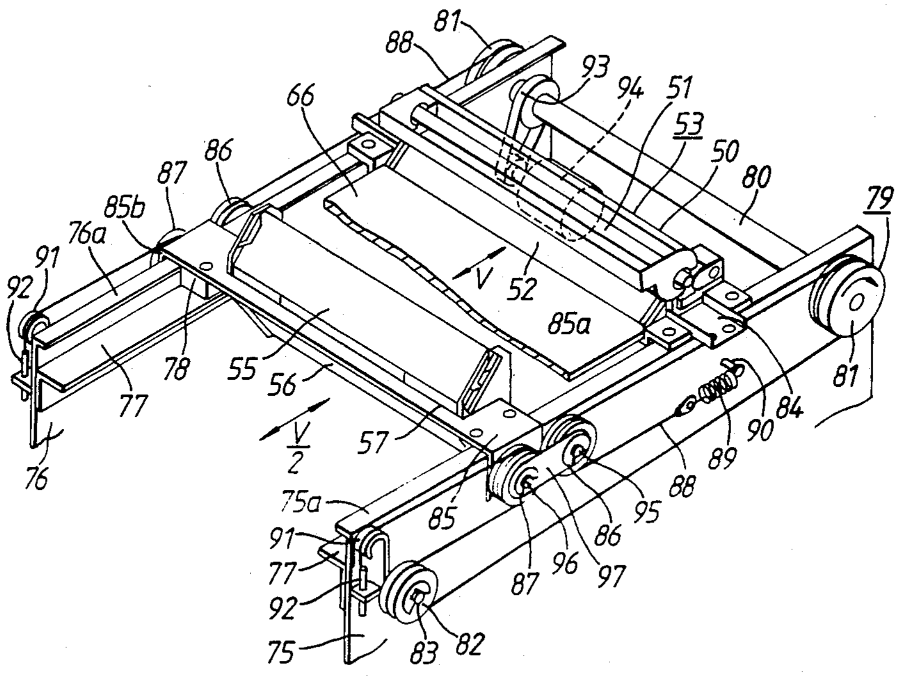

1st optical unit 53 and 2nd optical unit 57 are mounted and supported in the manner shown in FIG. 13 in a structure permitting displacement of 1st optical unit 53 at a speed V and 2nd optical unit 57 at a speed that is half of speed V. In more detail, guide frames 77 are mounted parallel to upper-edge horizontal sections 75*a* and 76*a* on mutually opposed side surfaces of rear frames 75 and 76 and are separated but aligned with one another. 1st optical unit 53 and 2nd optical unit 57 are mounted across side frames 77, with siders 78 fitted on the lower surface of their opposite ends and in sliding contact with the tops of guide frames 77. 1st optical unit 53 and 2nd optical unit 57 are thus mounted in a manner permitting them to move freely so that they can be moved at set speeds in set directions by an optical unit actuation mechanism 79.

The construction of optical unit actuation mechanism 79 is as follows. At one end going in the direction of the displacement of 1st and 2nd optical units 53 and 57, there is a drive shaft 80 that is mounted crossways facing one end which has drive pulleys 81 mounted on it opposite ends, which are on the outer sides of frames 75 and 76. The outer sides of frames 75 and 76 at the end corresponding to the other end in the direction of 1st and 2nd optical unit 53 and 57 displacement have follower pulleys 82 rotatably supported on the frames by support shafts 83. Opposite end portions of the carriage 84 of 1st optical unit 53 project to the outer sides of frames 75 and 76, while the opposite end portions of the carriage 85 of 2nd optical unit 57 have pulley mounting portions 85*a* and 85*b* that are bent over vertically and lie alongside the outer surfaces of frames 75 and 76. Pulley mounting portions 85*a* and 85*b* are each fitted with a pair of pulleys 86 and 87 that serve as running blocks. Intermediate portions of wires 88 are passed around and between the various pulleys 81, 82, 86 and 87 in a set manner. More specifically, each wire 88 has one end fixed to a fixed element 90 via a spring 89, is lead towards the follower pulley 82 end, is wound around 1st pulley 86 of 2nd optical unit 57 and doubled back, is then wound several times around drive pulley 81 and doubled back again towards follower pulley 82, is passed around follower pulley 82 and is then passed around 2nd pulley 87 of 2nd optical unit 57, after which it goes round a guide 91 and has its other end fixed to a fixed element 92. Wires 88 are fixed directly to opposite ends of carriage 84 of 1st optical unit 53.

Figure 14:
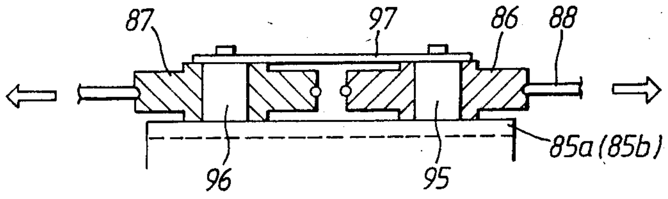

Drive shaft 80 is connected to a stepping motor 94 via a timing belt 93, thereby permitting drive pulleys 81 around which wires 88 are wound to be driven in forward direction or a reverse direction. The construction is also such that 1st optical unit 53 to which wires 88 are directly fixed is moved at a speed V, and 2nd optical unit 57 fitted with pulleys 86 and 87 which have wires 88 passed around them and which serve as running blocks is moved at a speed that is half speed V. As may be seen from FIG. 14, the pairs of pulleys 86 and 87 mounted on each end of 2nd optical unit 57 are mounted on independently disposed support shafts 95 and 96 on a line parallel to the direction of 2nd optical unit 57 movement, i.e., in a direction parallel to the direction of the wire 88 pulling force, the arrangement thus being one in which there is no moment acting in a direction normal to the direction of the wire 88 pulling force and in which a stable support state can be maintained for a long time without vibration being caused. Numeral 97 designates a connecting reinforcement element that connects the free ends of support shafts 95 and 96 on which pulleys 86 and 87 are rotatably mounted.

Changing the copy magnification in the manner noted earlier requires that it be possible to effect set amounts of displacement of lens unit 54 and 3rd optical unit 60 fitted with 4th and 5th mirrors 58 and 59 and disposed at an angle of 90°, these amounts being as noted in the following table if, for example, a lens with a focal distance f of 210 mm is used:

| Magnification | Amount of lens displacement (mm) | Amount of mirror displacement (mm) |
|---|---|---|
| 0.17 × (A3→A4) | 85.8 | 12.4 |
| 0.82 × (B4→A4) | 46.1 | 4.1 |
| 1.00 × (same size) | 0 | 0 |
| 1.41 × (A4→A3) | −16.1 | 12.5 |

Movement approaching the 3rd optical unit is (−), movement away is (+).

Figure 15:
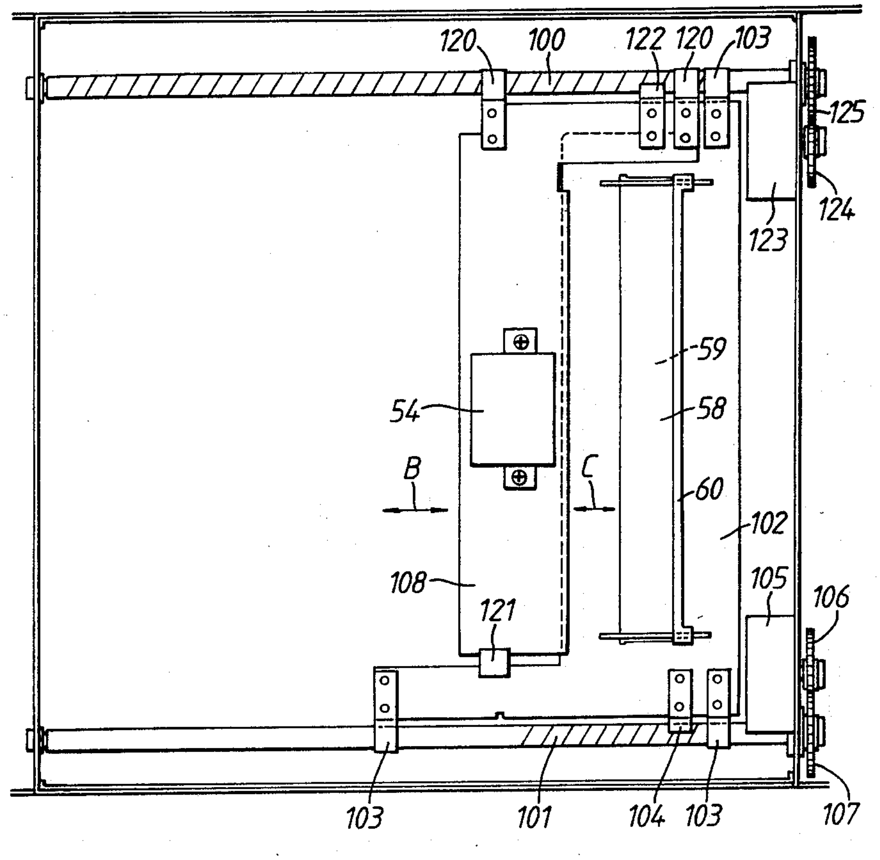

Lens unit 54 and 3rd optical unit 60 are mounted and supported in the manner shown in FIG. 15 so that lens unit 54 can be moved and 3rd optical unit 60 also can be moved, but with its displacement less than that of lens unit 54 so as to give a set copying magnification. In more detail, a pair of screwshafts 100 and 101 are rotatably mounted on either side of and parallel to the path of movement of units 54 and 60, and 3rd optical unit 60 is supported so that it is free to slide on screwshafts 100 and 101 by slide bushes 103 that are mounted on opposite ends of a carriage 102 and fitted around screwshafts 100 and 101. One end of carriage 102 has mounted thereon a spiral housing 104 which is engaged on screwshaft 101, whereby forward and reverse rotation of screwshaft 101 is accompanied by reciprocal movement of 3rd optical unit 60, guided by screwshafts 101 and 100. The drive force of a stepping motor 105 for mirror drive is transmitted to screwshaft 101 via a set of gears 106 and 107. The carriage 108 of lens unit 54 is slidably supported by having a first end supported by slide bushes 120 on screwshaft 100, while a slide 121 mounted underneath its other end is set directly on top of carriage 102 of 3rd optical unit 60. The first end of carriage 108 also has mounted thereon a spiral housing 122 that is engaged on screwshaft 100 and moves reciprocally in accompaniment to forward and reverse rotation of screwshaft 100, which is supplied with the drive force of a stepping motor 123 for lens drive via a set of gears 124 and 125.

Thus, 3rd optical unit 60 is moved a set distance in a set direction by forward or reverse rotation of mirror drive stepping motor 105, and lens unit 54 is moved a set distance in a set direction by forward or reverse rotation of lens drive stepping motor 123. During this process, the amount of displacement per unit time of 3rd optical unit 60, which need not move as far as lens unit 54, is made less than that of lens unit 54 by altering the frequencies of the drive pulses of mirror drive stepping motor 105 and lens drive motor 123. Given that with one and given amount of displacement of lens unit 60 and 3rd optical unit 54, 3rd optical unit 54 is responsible for a greater change in focussing and magnification, high positioning precision is achieved by effecting slow movement so as to avoid undesirable effects of inertia, etc.

Figure 1:
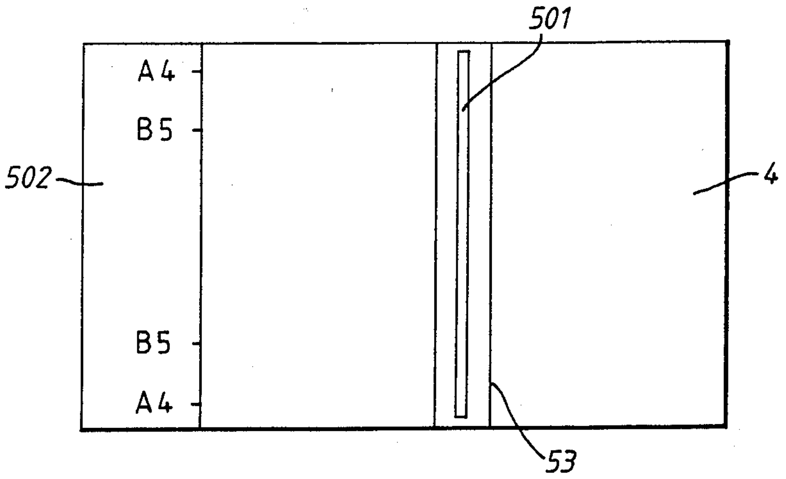
Figure 2:
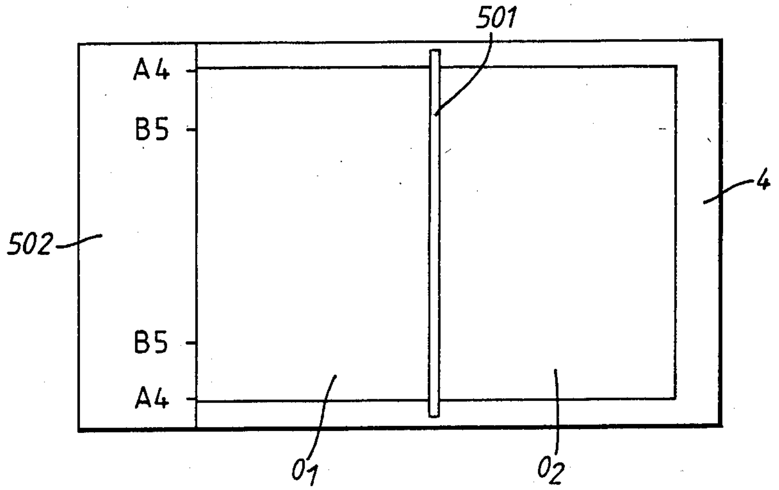
Figure 3:
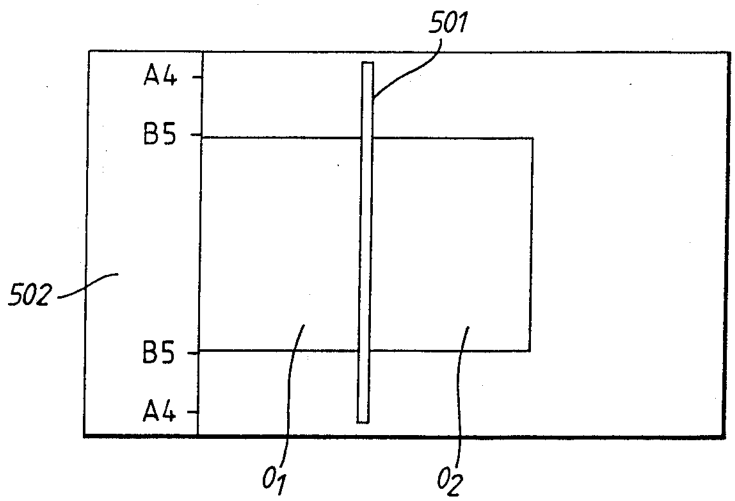

Next, a description of the principal aspects of the present invention will be given. As shown in FIG. 1, on the surface of 1st optical unit 53, used as an optical scanning means, a boundary line 501 is provided which is visible through original document table 4, and the stopping position of 1st optical unit 53 is controlled so that boundary line 501 is the boundary portion between two original documents. For example, if size A4 copy paper P is selected, two size A4 original documents 01 and 02 are set in place and positioned against boundary line 501 above 1st optical unit 53 and with respect to a scale 502 provided in a left-hand portion on original document table 4 as shown in FIG. 2. If, alternatively, size B5 copy paper P is selected, size B5 original documents 01 and 02 are set in place and positioned against boundary line 501 above 1st optical unit 53 and with respect to scale 502 as shown in FIG. 3.

Next, the movement of 1st optical unit 53 in actual practice will be described with reference to FIG. 4. For example, designating the length (width) of the selected copy paper size as 11, a position A that is a distance 11 from the edge B of scale 502 constitutes the boundary between two original documents 01 and 02. Stopping of the 1st optical unit 53 is therefore effected in such a manner that boundary line 501 above 1st optical unit 53 during standby is located at A.

During operation, 1st original document 01 and 2nd original document 02 are first set in place with position A constituting the boundary line between them. Then, when print key 30 is pressed, 1st optical unit 53 is moved back from position A to a position C, that is, the copy paper P length 11 plus a prescribed distance 12 (MV1). Next, 1st optical unit 53 is moved from position C to a position D, that is, a distance 12+11+13, so as to optically scan the 1st original document 01 (MV2). Distance 12 is provided to allow 1st optical unit 53 to be accelerated to cause 1st optical unit 53 to be moved from a position B to position A, which is distance 11, at a constant scan speed. Similarly, distance 13 is provided for deceleration of 1st optical unit 53, thereby causing 1st optical unit 53 to be stopped after 1st optical unit 53 is moved from position B to position A, which is distance 11. After completion of scanning 1st original document 01, 1st optical unit 53 is moved back to a position E from position D, that is, a distance 13+12 (MV3). Then, 1st optical unit 53 is moved from position E to a position G, that is, a distance 12+11+13, to optically scan 2nd original document 02 (MV4). Distance 12 is defined between positions E and A and is the accelerating section the same as that described above. Similarly, distance 13 is defined between positions F and G and is the decelerating section the same as that described above. After completion of the scanning of 2nd original document 02, 1st optical unit 53 is moved back to position A from position G, that is, a distance 13+11 (MV5). The arrangement when scanning is effected in this manner is, for example, that the 1st original document 01 is copied on the top side of a 1st sheet of copy paper P and the 2nd original document 02 is copied on the top side of a 2nd sheet of copy paper P or that the 1st original document 01 is copied on the top side of a sheet of copy paper P and the 2nd original document 02 is copied on its rear side.

Figure 6:
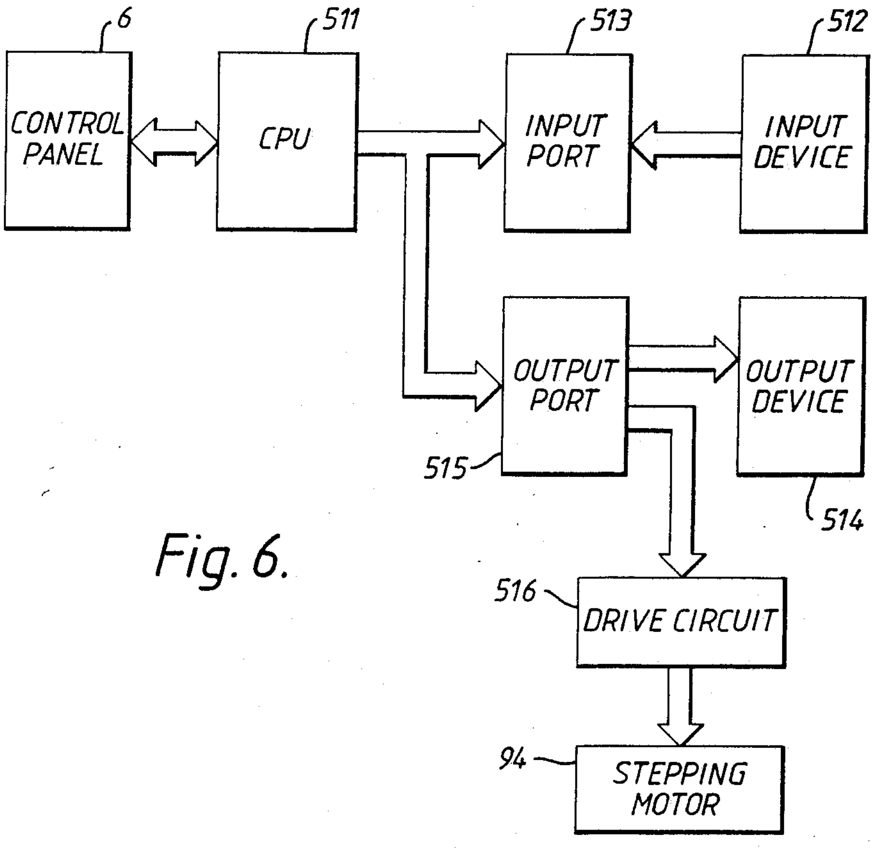

In this embodiment, stepping motor 94 is used as the drive source for 1st optical unit 53, a noted above. Open-loop positioning control of 1st optical unit 53 is effected by using a microcomputer (abbreviated below to "CPU") to control stepping motor 94. An example of a control circuit for effecting this positioning control is shown in FIG. 6, in which numeral 511 designates a CPU that effects overall apparatus control. Numeral 6 designates the above-noted control panel for giving various displays and effecting various key inputs. Numeral 512 designates an input device for various switches, different sensors and copy paper size detection means, etc. Numeral 513 designates an input port for input device 512. Numeral 514 designates an output device for an exposure lamp, a fixing unit's heater, high voltage source for various chargers and various motors, etc. Numeral 515 designates an output port for output device 514, and numeral 516 designates a drive circuit for driving stepping motor 94. In a configuration such as this, CPU 511 effects the driving of stepping motor 94 and controls the stopping position of 1st optical unit 53 on the basis of the findings of selected copy paper size detection that are input via input device 512. Then, on depression of copy key 30, displacement of 1st optical unit 53 is controlled in the manner described above.

Figure 4:
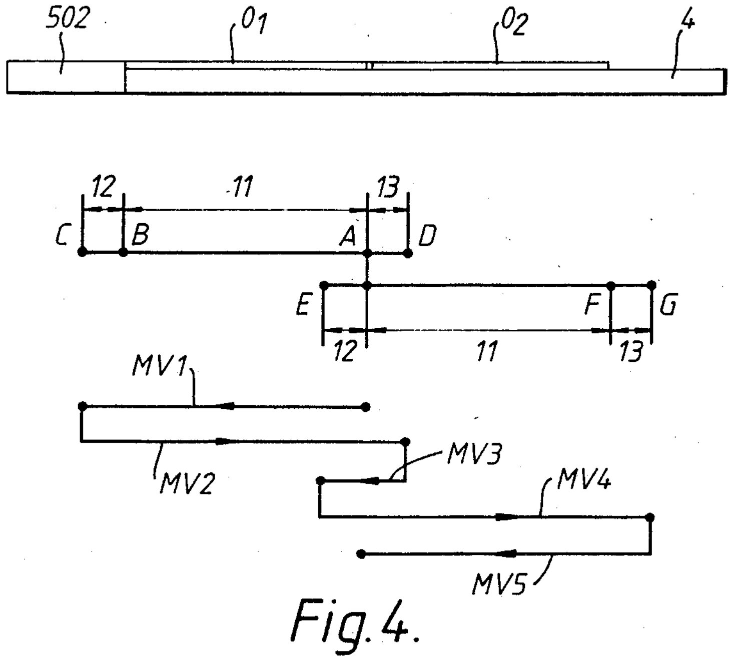
Figure 5:
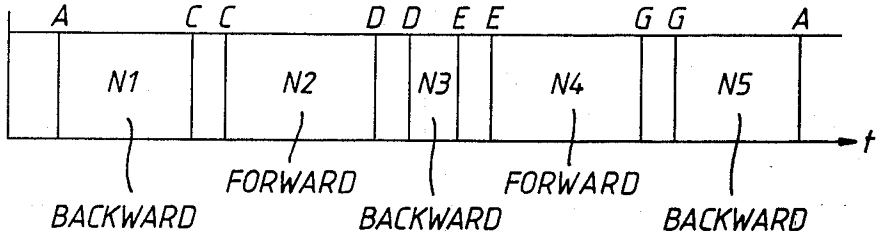

Next, the driving method of stepping motor 94 which moves 1st optical unit 53 as shown in FIG. 4 (MV1–MV5), will be described. As is well-known, the rotational speed of a stepping motor can be controlled exactly by changing the frequency of exciting pulse to alternate the windings being excited. A rotor included in the stepping motor rotates on one step by selectively supplying the exciting pulse to the windings in prescribed rates. Stepping motor 94 used in the preferred embodiment of the present invention, for example, connects to 1st optical unit 53 so as to move 1st optical unit 53 a distance of 0.15 mm by one step rotation of the rotor. FIG. 5 shows a timechart relating the time and step numbers of the stepping motor as it moves the 1st optical unit. The size of original documents 01 and 02, or 11 as shown in FIG. 4, are 210 mm in case of A4 size copy paper and 182 mm in case of B5 size copy paper. The distance 12 for accelerating 1st optical unit 53 is 15 mm, and distance 13 for decelerating 1st optical unit 53 is 15 mm. Therefore, 1st optical unit 53 is moved to scan A4 and B5 size documents, respectively, by the step numbers of the stepping motor as shown in the following table:

TABLE

| | N1 (MV1) | N2 (MV2) | N3 (MV3) | N4 (MV4) | N5 (MV5) |
|---|---|---|---|---|---|
| A4 | 1500 | 1652 | 240 | 1652 | 1564 |
| B5 | 1313 | 1464 | 240 | 1464 | 1375 |

Thus, as described in detail above, the invention provides an image forming apparatus in which the location of the boundary between original documents is clearly known and two original documents can be set properly in place.

What is claimed is:

1. An image forming apparatus comprising:

an original document table having a transparent glass with two original document holding areas capable of holding first and second original documents in place on said respective holding areas;

a stepping motor having a rotational speed which is controlled by changing the frequency of an electric exciting pulse supplied thereto, rotational steps of said stepping motor being controlled by supplying the electric exciting pulse thereto in a prescribed time;

optical scanning means, operatively connected to said stepping motor to be relatively moved along said original document table, for optically scanning said first and second original documents placed on said original document table and for forming reflected light images thereof;

image forming means for producing visible images on an image forming medium corresponding to said light images; and controlling means for controlling said stepping motor: (1) to normally position said optical scanning means at a boundary portion between said first original document and said second original document, (2) to move said optical scanning means in a scanning direction a first prescribed distance comprising a first accelerating section, a first scanning section corresponding to said first original document for scanning said first original document at a constant speed, and a first decelerating section, respectively, by changing the frequency of the electric exciting pulse supplied to said stepping motor and supplying the electric exciting pulse to said stepping motor in the prescribed time, (3) to move said optical scanning means in the scanning direction a second prescribed distance comprising a second accelerating section, a second scanning section corresponding to said second original document for scanning said second original document at a constant speed, and a second decelerating section, respectively, by changing the frequency of the electric exciting pulse supplied to said stepping motor and supplying the electric exciting pulse to said stepping motor in the prescribed time, and (4) to return said optical scanning means to said boundary portion between said first original document and said second original document after the optical scanning of said first and second original documents.

2. An apparatus according to claim 1, wherein said original document table is stationary and said optical scanning means moves relative to said original table.

3. An apparatus according to claim 1, wherein said image forming means includes:

a photosensitive drum which receives said light images to form electrostatic latent images thereon;

means for developing said electrostatic latent images to obtain visible images on said photosensitive drum; and means for transferring said visible images onto said image forming medium.

4. An apparatus according to claim 3, wherein said image forming medium is copy paper.

5. An apparatus according to claim 1, wherein said controlling means further controls said optical scanning means to be normally positioned at the boundary portion between said first original document and said second original document in accordance with the size of said image forming medium.

* * * * *